United States Patent
Keyser et al.

(10) Patent No.: US 9,517,745 B1
(45) Date of Patent: Dec. 13, 2016

(54) AIRBAG CUSHION TO HOUSING RETAINING FEATURE AND RELATED METHODS AND SYSTEMS

(71) Applicant: Autoliv ASP, Inc., Ogden, UT (US)

(72) Inventors: David Keyser, Orion, MI (US); Donald Paxton, Romeo, MI (US); Michael Brian Kutchey, Ortonville, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/788,451

(22) Filed: Jun. 30, 2015

(51) Int. Cl.
*B60R 21/20* (2011.01)
*B60R 21/205* (2011.01)

(52) U.S. Cl.
CPC ............. *B60R 21/20* (2013.01); *B60R 21/205* (2013.01)

(58) Field of Classification Search
CPC ............................... B60R 21/20; B60R 21/205
USPC ....................................................... 280/728.2
See application file for complete search history.

(56) References Cited

U.S. PATENT DOCUMENTS

| | | | | |
|---|---|---|---|---|
| 4,111,457 A * | 9/1978 | Kob | ...................... | B60R 21/217 280/728.2 |
| 4,986,569 A | 1/1991 | Bruton | | |
| 5,310,213 A * | 5/1994 | Mori | ................... | B60R 21/2171 220/4.23 |
| 5,356,174 A * | 10/1994 | Rhein | ................. | B60R 21/2171 280/728.2 |
| 5,560,644 A * | 10/1996 | Fiore | ................... | B60R 21/2171 280/728.2 |
| 5,607,179 A * | 3/1997 | Lenart | ................. | B60R 21/2171 280/728.2 |
| 5,799,970 A * | 9/1998 | Enders | .................. | B60R 21/207 280/728.2 |
| 5,836,608 A * | 11/1998 | Soderquist | ............ | B60R 21/217 280/728.2 |
| 5,876,058 A * | 3/1999 | Nemoto | .............. | B60R 21/2171 280/728.2 |
| 6,092,833 A * | 7/2000 | Nariyasu | ............. | B60R 21/2171 280/728.2 |
| 6,126,191 A | 10/2000 | Pepperine et al. | | |
| 6,283,497 B1 | 9/2001 | Zimmerbeutel et al. | | |
| 7,900,954 B2 | 3/2011 | Sahm | | |

(Continued)

FOREIGN PATENT DOCUMENTS

| | | |
|---|---|---|
| CA | 2014600 | 12/1990 |
| CA | 2108325 | 6/1994 |

(Continued)

OTHER PUBLICATIONS

Concise Explanation of Relevance of DE7540488.

(Continued)

*Primary Examiner* — Faye M Fleming
(74) *Attorney, Agent, or Firm* — Phillips Ryther & Winchester; Matthew D. Thayne (57) ABSTRACT

Apparatus, methods, and systems for retaining an airbag cushion to an airbag housing. Some embodiments may comprise an airbag housing comprising an outer surface, an airbag coupling ring configured to fit over the outer surface of the airbag housing, and an airbag cushion positioned in between the airbag housing and the airbag coupling ring such that the airbag cushion is pinched between the airbag coupling ring and the outer surface of the airbag housing so as to retain the airbag cushion to the airbag housing during deployment of the airbag cushion.

21 Claims, 6 Drawing Sheets

(56) References Cited

U.S. PATENT DOCUMENTS

2005/0225059 A1  10/2005  Lewis et al.

FOREIGN PATENT DOCUMENTS

| | | |
|---|---|---|
| DE | 7540488 | 4/1976 |
| DE | 19850463 | 5/2000 |
| GB | 2323572 | 9/1998 |

OTHER PUBLICATIONS

Concise Explanation of Relevance of DE19850463.
International Search Report for PCT/US16/38221, Jul. 29, 2016, 5 pgs.
Written Opinion for PCT/US16/38221, Jul. 29, 2016, 5 pgs.

* cited by examiner

AIRBAG CUSHION TO HOUSING RETAINING FEATURE AND RELATED METHODS AND SYSTEMS

SUMMARY

Many current techniques for coupling airbag cushions to airbag housings require fabric reinforcements, such as fabric layers, formed in the throat region of the cushion. The throat is then typically coupled with the housing by coupling the throat around the inflator by using, for example, a retainer ring. Such reinforcement may be needed in order for the cushion to withstand the heat and/or forces in such proximity to the inflator. The fabric and/or labor costs associated with such reinforcement measures can be prohibitive, or at least undesirable.

The present inventors have therefore determined that it would be desirable to provide systems and methods that overcome one or more of the foregoing limitations and/or other limitations of the prior art. For example, the present inventors have determined that, by providing, in some embodiments, an airbag assembly in which the airbag cushion is mounted to a mouth of the housing rather than around the perimeter of an airbag inflator and/or inflator opening in the housing, cushion reinforcements around the throat may be unnecessary. Some embodiments may be particularly useful in connection with passenger-side airbag assemblies.

In some embodiments, a deep drawn housing may be provided with a lip on the top edge. A fabricated airbag coupling ring, such as a B-ring, may be oversized with respect to the housing to allow the coupling ring to fit around an exterior or, alternatively, within an interior, surface of the housing with a small gap for the cushion. The coupling ring may comprise hooks or mounting flanges to allow for coupling the airbag assembly to a vehicle, such as to an instrument panel of a vehicle.

The airbag cushion may be positioned in between the housing and the coupling ring. An engagement feature on the housing, coupling ring, and/or airbag cushion may be used to prevent the cushion from pulling through the coupling ring. In some embodiments, tension on the cushion may cause the coupling ring to more tightly engage the cushion and/or housing. An engagement feature on the housing and/or coupling ring may be used to lock the coupling ring into place and secure the cushion to the assembly.

In some implementations, the assembly process may proceed by coupling the inflator with studs or other fasteners into the housing. The housing may then be positioned into the cushion throat. The coupling ring may then be placed over the cushion and housing from the bottom of the housing. The cushion and coupling ring may be pulled together towards a lip on the mouth of the housing, thereby creating a tighter fit to pinch the cushion therebetween. In some embodiments and implementations, this may be caused by the draw angle on the housing. Once the cushion and coupling ring have reached the lip on the housing, a dart or other engagement feature on the housing and/or coupling ring may be used to lock the cushion and coupling ring into place. In some embodiments and implementations, a feature on the cushion, such as a rim, hook, hole, or the like, may engage with the coupling ring and/or housing to prevent the cushion from pulling through the coupling ring/housing interface.

Because, in some embodiments disclosed herein, the cushion is mounted to the mouth of the housing, a retainer ring may no longer be necessary. Thus, studs or other fasteners may be coupled directly into an inflator flange. In addition, previously-used fabric reinforcements may be avoided in connection with certain embodiments. Thus, some embodiments may comprise a cushion lacking a reinforced throat region. As used herein, a cushion lacking a reinforced throat region may comprise a cushion having reinforcements but not added reinforcements in the throat region of the cushion. These features may result in substantial cost savings. The coupling ring may also be configured so as to limit bell mouthing during deployment. In some embodiments, further cost savings may be achieved by manufacturing the housing from thinner steel, other metals, or plastic than would otherwise typically be required. Similarly, some embodiments may not require side panel doublers or other heat shielding commonly used in current applications. This is because, in preferred embodiments disclosed herein, the housing, rather than the cushion, may absorb the majority of the heat from the inflator during deployment.

In some embodiments, the cushion need not extend deep inside the housing for affixation. Instead, the cushion may be coupled with the housing at, or at least near, the peripheral edge of the housing opening, rather than the inflator opening. Thus, some embodiments may be configured such that the cushion is coupled with the airbag housing at a distance of at least between about 50 mm and about 80 mm from the airbag inflator.

In some embodiments, the cushion may be coupled with the housing without extending inside the housing at all. This enables the deploying airbag module to use the housing as the plenum area for the inflator, and removes the cushion fabric from this high-temperature/high-stress/high-pressure area around the inflator. Using the rigid metal or plastic of the airbag housing itself, rather than the cushion, to serve as the structural/functional support for the inflator output instead may render the assembly less susceptible to integrity issues from heat, erosion, inflator particulates, etc.

In some embodiments, the cushion may be wrapped around and/or through various components/features on the housing and/or coupling ring. In some embodiments, this may be accomplished without the usage of additional fasteners, such as rivets or screws. In some embodiments, the assembly may be configured to at least substantially avoid having the airbag cushion extend into the airbag housing. In some such embodiments, the assembly may be configured to entirely avoid having the airbag cushion extend into the airbag housing.

In some embodiments, the housing and/or coupling ring may be configured to "pinch" the cushion for deployment/load support. Some embodiments may further be configured to affix the cushion using, for example a plurality of spaced hook/tab features. In some embodiments, such features may also be used to couple the assembly to a vehicle.

In a more particular example of an airbag assembly according to some embodiments, the assembly may comprise an airbag housing comprising an outer surface; an airbag coupling ring configured to fit over the outer surface of the airbag housing; and an airbag cushion positioned in between the airbag housing and the airbag coupling ring such that the airbag cushion is pinched between the airbag coupling ring and the outer surface of the airbag housing so as to retain the airbag cushion to the airbag housing during deployment of the airbag cushion.

In some embodiments, the airbag coupling ring may comprise a B-ring. In some embodiments, the airbag coupling ring may comprise a split ring.

In some embodiments, the airbag coupling ring may further comprise means for coupling the airbag assembly to a vehicle. In some embodiments, the means for coupling the airbag assembly to a vehicle may further comprise means for coupling the airbag assembly to an instrument panel of a vehicle. The means for coupling the airbag assembly to a vehicle may comprise, for example a plurality of hooks extending about an exterior surface of the airbag coupling ring.

In some embodiments, the airbag housing may comprise a bottom wall and an open end opposite from the bottom wall, the open end defined by a peripheral edge of the airbag housing. The bottom wall may define an opening, which opening may be configured to receive an inflator.

In some embodiments, the airbag housing may comprise an engagement feature configured to lock the airbag coupling ring in place with respect to the airbag housing.

In another example of an airbag assembly according to other embodiments, the assembly may comprise an airbag housing comprising an inner peripheral surface and an outer peripheral surface. An airbag coupling ring may be provided that may be configured to be slidably positioned adjacent to at least one of the inner peripheral surface and the outer peripheral surface of the airbag housing. An airbag cushion may be positioned in between at least one of the inner peripheral surface and the outer peripheral surface of the airbag housing and the airbag coupling ring such that the airbag cushion is pinched between the airbag coupling ring and the airbag housing so as to retain the airbag cushion to the airbag housing during deployment of the airbag cushion.

In some embodiments, the airbag coupling ring may be positioned adjacent to the outer peripheral surface of the airbag housing. The airbag housing may comprise an engagement feature configured to lock the airbag coupling ring in place with respect to the airbag housing. In some embodiments, the airbag coupling ring may also comprise an engagement feature configured to engage with the engagement feature of the airbag housing to lock the airbag coupling ring in place with respect to the airbag housing.

In some embodiments, the engagement feature of the airbag housing may comprise an opening in the airbag housing, and the engagement feature of the airbag coupling ring may comprise a projection configured to fit within the opening in the airbag housing to lock the airbag coupling ring in place with respect to the airbag housing.

The engagement feature(s) of the airbag housing may comprise, for example, a projection formed on the airbag housing, a spring finger extending from the airbag housing, and/or an opening formed within the housing.

In some embodiments, the airbag cushion may be wrapped around an edge of the airbag coupling ring, and at least a portion of the airbag coupling ring may extend through the airbag cushion.

In some implementations of methods for assembly of an airbag assembly, the method may comprise obtaining an airbag housing comprising a bottom wall, the bottom wall defining an opening for receipt of an inflator; an airbag coupling ring; and an airbag cushion comprising a throat and a closed end opposite from the throat. A first end of the airbag housing may be positioned into the throat of the airbag cushion. The airbag coupling ring may be slid or otherwise positioned over the airbag cushion and the airbag housing such that a periphery of the airbag cushion is positioned between the airbag coupling ring and the airbag housing. The airbag coupling ring may then be locked to the airbag housing to secure the coupling ring to the airbag housing and retain the airbag cushion to the airbag housing during deployment of the airbag cushion.

In some implementations, the step of locking the airbag coupling ring to the airbag housing may comprise extending the airbag coupling ring either up to or past an engagement feature to lock the airbag coupling ring in place with respect to the airbag housing.

In some implementations, the step of locking the airbag coupling ring to the airbag housing may comprise extending a plurality of projections extending from the airbag coupling ring through a plurality of openings in the airbag cushion. In some such implementations, the plurality of projections may be further configured to allow for coupling the airbag assembly to a vehicle.

Some implementations may further comprise positioning the inflator into the opening and coupling the inflator with the airbag housing. In some such implementations, this step may be performed prior to positioning the airbag housing into the throat of the airbag cushion.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to flat panel airbag cushions. In preferred embodiments and implementations, such airbag cushions may comprise one or more sets of pleats configured to unfold during deployment to allow for, in some embodiments, two flat panels to expand into desired three-dimensional shapes that may be dictated by the positioning, size, shape, and/or interactions of the various pleats.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Figure 1:
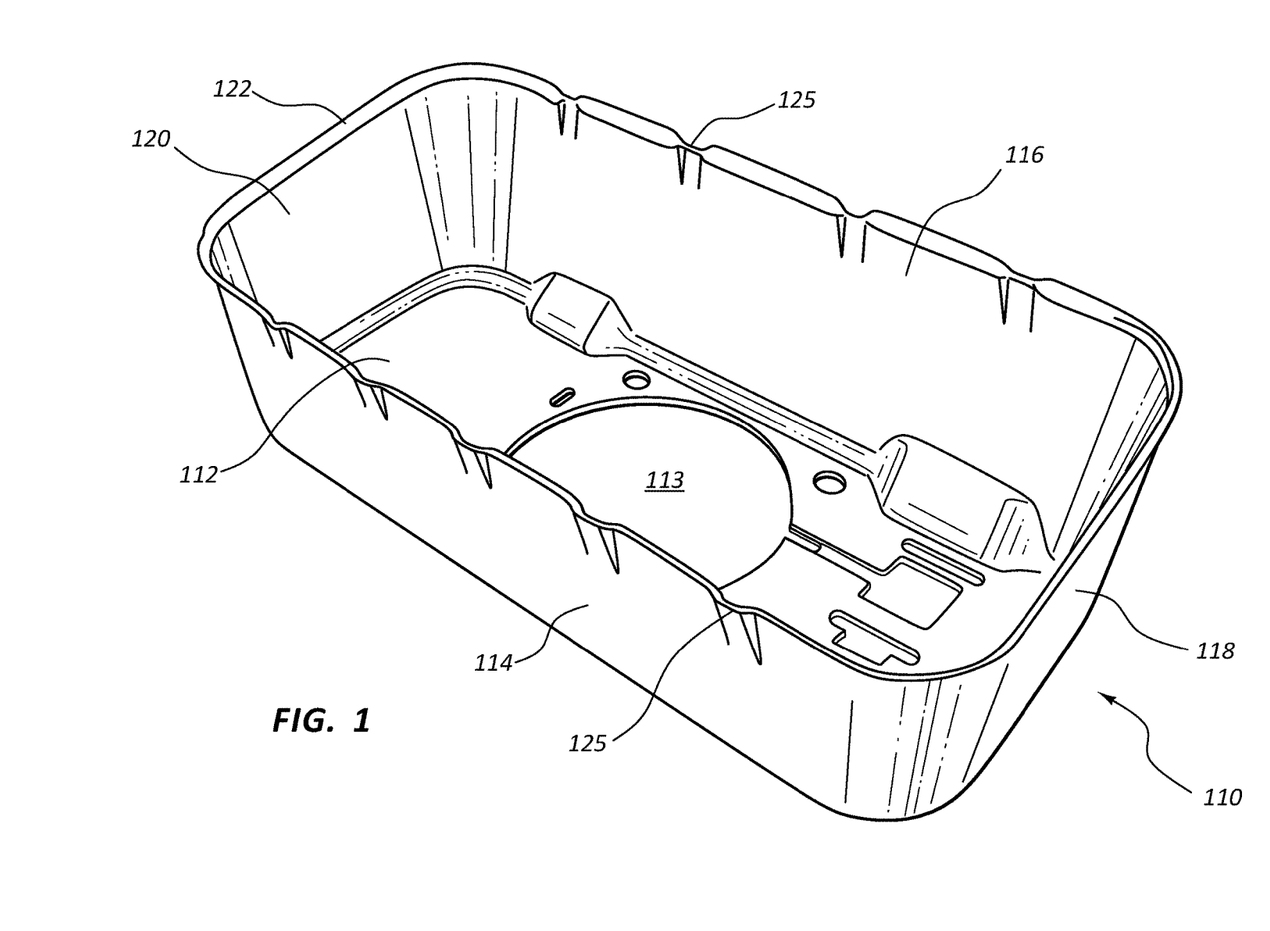
FIG. 1 is a perspective view of an airbag housing configured for use in connection with some embodiments.

FIG. 1 is a perspective view of an embodiment of an airbag housing 110 configured for use in connection with certain airbag assemblies disclosed herein. Airbag housing 110 is in the shape of a box, and comprises a bottom wall 112 and four sidewalls, namely, sidewalls 114, 116, 118, and 120. Bottom wall 112 defines an opening 113, which opening may be configured to receive an inflator. Airbag housing 110 comprises an open end opposite from the bottom wall 112 that is defined by a peripheral edge of the airbag housing 110. Thus, there is no wall opposite from bottom wall 112. Each of the sidewalls 114/116/118/120 terminates at a lip 122 that extends about the entire periphery of an upper end of airbag housing 110. As discussed below, lip 122 may prevent a coupling ring from extending all of the way over the airbag housing 110 during assembly of an airbag assembly. Although airbag housing 110 is in the shape of a rectangular prism, a wide variety of other shapes are possible, as those of ordinary skill in the art will appreciate.

Airbag housing 110 further comprises a plurality of protrusions 125 formed on opposing walls 114 and 116. More particularly, protrusions extend from an outer peripheral surface of opposing walls 114 and 116. As discussed in greater detail below, protrusions 125 may be configured to engage corresponding features on a coupling ring to facilitate a desired coupling between airbag housing 110 and the coupling ring and/or an airbag cushion. As shown in FIG. 1, in the depicted embodiment, protrusions 125 comprise ramped protrusions. In other words, protrusions 125 increase in size (the amount with which they protrude from their respective sidewall) from the bottom to the top (from the bottom wall 112 to the lip 122). This may allow for the coupling ring to easily engage the airbag housing 110 but more tightly engage airbag housing 110 as it is moved from a lower side to an upper side of the airbag housing 110.

Figure 2:
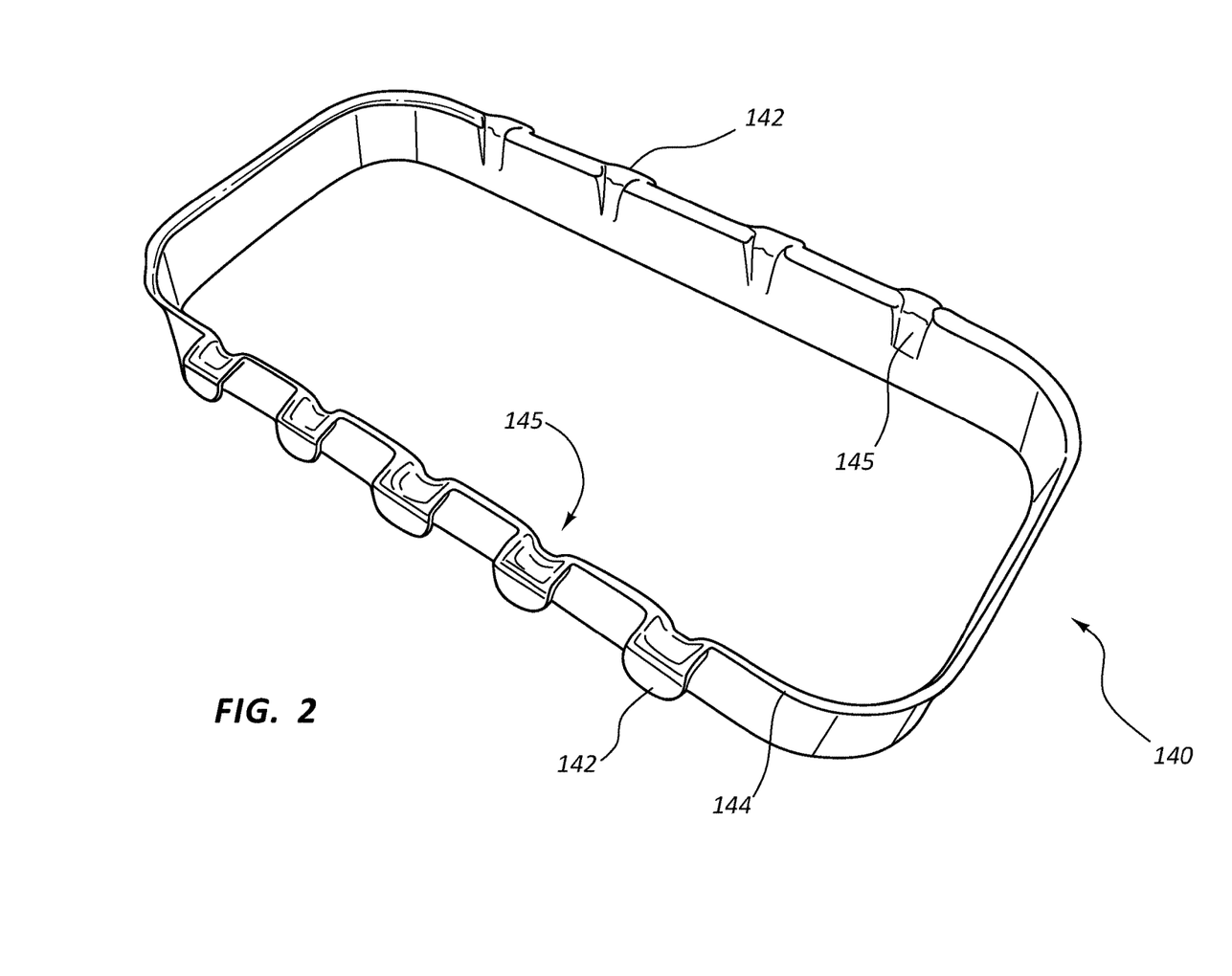
FIG. 2 is a perspective view of a coupling ring configured to be coupled with the airbag housing of FIG. 1 to retain an airbag cushion in place around a perimeter of the coupling ring and airbag housing.

FIG. 2 is a perspective view of a coupling ring 140 configured to be coupled with airbag housing 110 to retain an airbag cushion (not shown in FIG. 2) in place about a perimeter of the coupling ring 140 and airbag housing 110. In the depicted embodiment, coupling ring 140 comprises a B-ring having a cross-sectional shape that is at least substantially identical to that of airbag housing 110, thereby allowing coupling ring 140 to be slidably received over the exterior surfaces of airbag housing 110. Although coupling ring 140 comprises a ring defining a closed loop, alternative embodiments are contemplated in which coupling ring 140 may instead only partially define a loop, such as a split ring.

Coupling ring 140 comprises a plurality of projections 142 that may be configured to allow for the assembly comprising coupling ring 140 and airbag housing 110 to be coupled to a vehicle, such as to an instrument panel of a vehicle in the case of a passenger-side airbag assembly, for example. In the depicted embodiment, projections 142 comprise hooks. However, other embodiments are contemplated in which flanges, tabs, or other projections may be used for such coupling. Hooks 142, coupling flanges, and tabs are each examples of means for coupling an airbag assembly to a vehicle. As discussed below, some embodiments may be configured such that projections 142 alternatively, or additionally, are used to fit through openings in the airbag cushion to provide further stability to the assembly during deployment.

Coupling ring 140 further comprises a plurality of recessions 145 corresponding to the plurality of protrusions 125 of airbag housing 110 (in FIG. 1). Protrusions 125 may fit within recessions 145 during assembly, thereby facilitating a desired coupling between airbag housing 110 and coupling ring 140. Coupling ring 140 may further comprise a lip 144 extending about a perimeter of an upper portion of coupling ring 140, which may be similar in shape and/or size to lip 122 of airbag housing 110.

Coupling ring 140 may, in some embodiments, be configured to be received over a lower portion of airbag housing 110 (corresponding to the region comprising bottom wall 112, for example) and slid up towards the opposite, upper portion of the airbag housing 110. Thus, in some embodiments, airbag housing 110 may be configured such that the lower region is narrower and gradually increases in cross-sectional distance (from at least one dimension) towards the upper end of the housing 110. In this manner, as the coupling ring 140 is moved towards lip 122, the engagement between the airbag housing 110 and the coupling ring 140 may be tightened and, in embodiments in which the cushion is positioned at least partially in between the housing 110 and the coupling ring 140, the cushion may be pinched more tightly as the coupling ring 140 is slid towards the upper end of the housing 110. This aspect will be more apparent when considered in connection with the other figures and accompanying description below.

Figure 3:
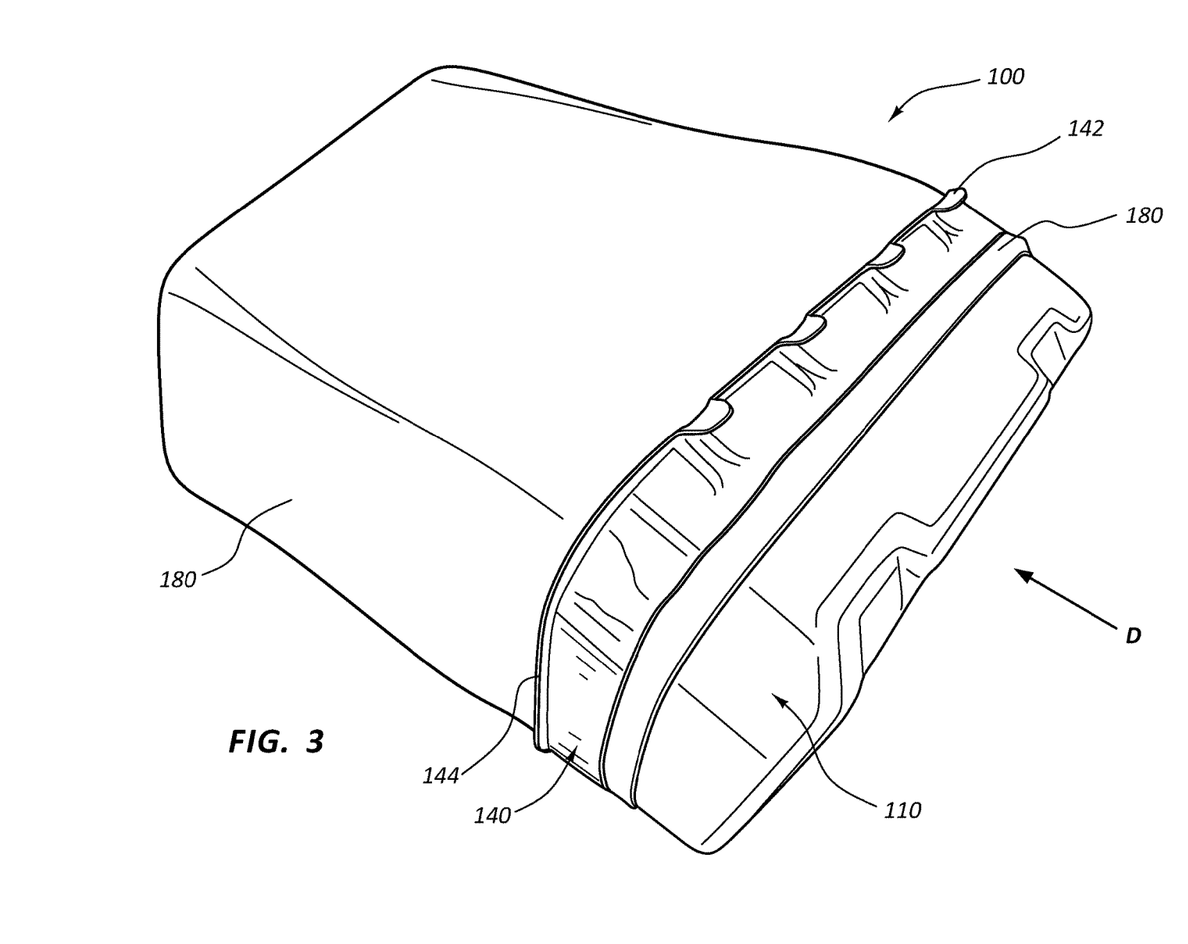
FIG. 3 is a perspective view of an airbag assembly according to some embodiments comprising the airbag housing of FIG. 1, the coupling ring of FIG. 2, and an airbag cushion.

FIG. 3 is a perspective view of an airbag assembly 100 comprising airbag housing 110, coupling ring 140, and an airbag cushion 180. As illustrated in this figure, airbag cushion 180 has been pinched between the airbag coupling ring 140 and the outer surface of the airbag housing 110 so as to retain the airbag cushion 180 to the airbag housing 110 during deployment of the airbag cushion 180.

Thus, in some implementations of methods for assembly of an airbag assembly, airbag housing 110 may be positioned into an opening or throat of airbag cushion 180. The airbag coupling ring 140 may then be positioned over the airbag cushion 180 and the airbag housing 110, preferably from the lower end of the airbag housing 110 in the direction of arrow "D," such that a periphery of the airbag cushion 180 about the throat region is positioned between the airbag coupling ring 140 and the airbag housing 110. The airbag coupling ring 140 may then be locked to the airbag housing 110 to secure the coupling ring 140 to the airbag housing 110 and retain the airbag cushion 180 to the airbag housing 110 during deployment of the airbag cushion 180. This locking step may be accomplished in a number of alternative ways and may be accomplished using a number of alternative features/structures, as discussed below.

Figure 4A:
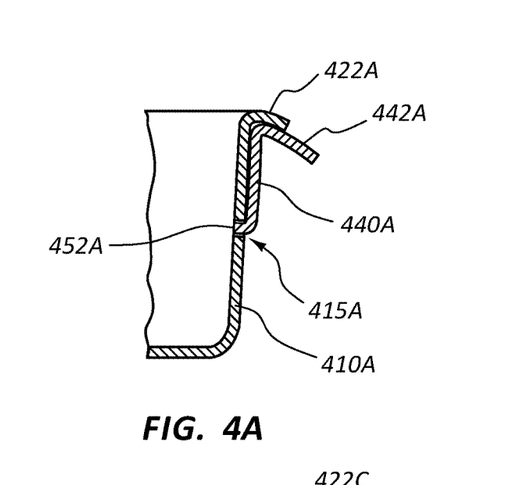
FIG. 4A is a cross-sectional view depicting an example of engagement features comprising a projection on the coupling ring engaging an opening in the airbag housing configured to lock an airbag coupling ring in place with respect to an airbag housing.

FIG. 4A is a cross-sectional view depicting a first example of certain embodiments of engagement features that may be used to lock an airbag coupling ring, such as coupling ring 140, to an airbag housing, such as airbag housing 110. More particularly, the embodiment of FIG. 4A comprises an airbag housing 410A comprising a lip 422A at its upper end, which may comprise an open end lacking an upper wall or surface. Airbag housing 410A further comprises an opening 415A, which may be configured to receive a corresponding projection 452A on the airbag coupling ring 440A and thereby lock airbag coupling ring 440A in place with respect to airbag housing 410A.

Although not specifically shown in FIG. 4A, it should be understood that an airbag cushion will also be present in the fully-assembled configuration. For example, in certain preferred embodiments and implementations, the airbag cushion may be positioned/pinched in between airbag coupling ring 440A and airbag housing 410A. Thus, during assembly, airbag coupling ring 440A may be positioned over an airbag cushion that has been stretched over an upper end of airbag housing 410A, as described above, and then slid towards the upper end of the housing 410A until projection 452A has engaged opening 415A in housing 410A. In some embodiments, holes may be formed in the airbag cushion in order to receive projection 452A. Alternatively, projection 452A may wedge a portion of the cushion within opening 415A. Still other alternatives are possible, as discussed below. For example, in some embodiments, hooks 442A or other similar means for coupling an airbag assembly to a vehicle may be positioned through or otherwise engage the cushion as well.

Figure 4B:
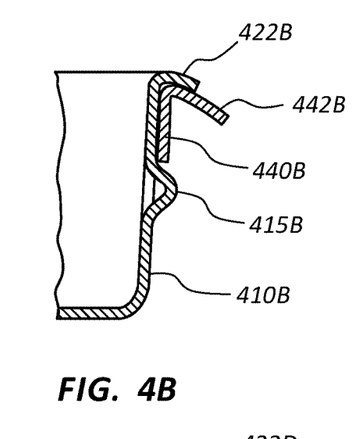
FIG. 4B is a cross-sectional view depicting an example of an engagement feature comprising a projection on the airbag housing configured to lock an airbag coupling ring in place with respect to an airbag housing.

FIG. 4B is a cross-sectional view depicting another example of an engagement feature that may be used to lock an airbag coupling ring, such as coupling ring 140, to an airbag housing, such as airbag housing 110. More particularly, the embodiment of FIG. 4B comprises an airbag housing 410B comprising a lip 422B at its upper end, which may comprise an open end lacking an upper wall or surface. A projection 415B is formed on the airbag housing 410B and is configured to lock airbag coupling ring 440B in place with respect to airbag housing 410B. As described above, airbag coupling ring 440B may comprise a hook 442B or another such means for coupling an airbag assembly to a vehicle.

Projection 415B may comprise, in some embodiments, a buckled or bent portion of airbag housing 410B. During assembly, airbag coupling ring 440B may be positioned over an airbag cushion that has been stretched over an upper end of airbag housing 410B, as described above, and then slid towards the upper end of the housing 410B until the lower end of airbag coupling ring 440B has passed by and engaged projection 415B, thereby, in some embodiments, pinching at least a portion of an airbag cushion in between coupling ring 440B and housing 410B and locking coupling ring 440B in place on housing 410B.

Figure 4C:
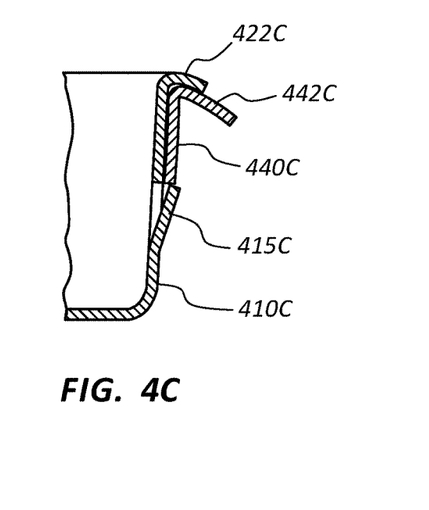
FIG. 4C is a cross-sectional view depicting an example of an engagement feature comprising a spring finger on the airbag housing configured to lock an airbag coupling ring in place with respect to an airbag housing.

FIG. 4C is a cross-sectional view depicting still another example of an engagement feature configured to lock an airbag coupling ring in place with respect to an airbag housing. More particularly, the embodiment of FIG. 4C comprises an airbag housing 410C comprising a lip 422C at its upper end. A projection 415C is formed on the airbag housing 410C and is configured to lock airbag coupling ring 440C in place with respect to airbag housing 410C. Projection 415C may comprise a spring finger or another resilient member that may be configured to flex towards a center of airbag housing 410 to allow airbag coupling ring 440C to slide by projection 415C. However, preferably projection 415C is resiliently biased towards the position depicted in FIG. 4C such that, after passing by projection 415C, the projection 415C may spring back in place to prevent the coupling ring 440C from being withdrawn from the housing 410C. Again, airbag coupling ring 440C may comprise a hook 442C or another such means for coupling an airbag assembly to a vehicle in some embodiments.

Figure 4D:
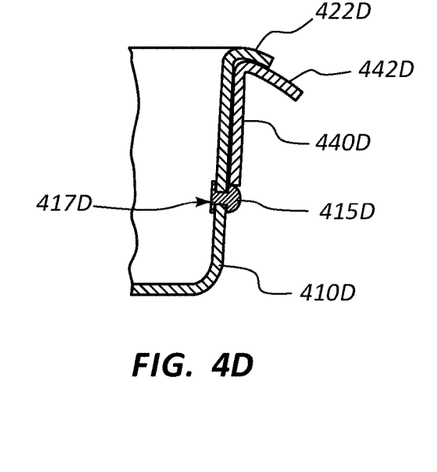
FIG. 4D is a cross-sectional view depicting an example of an engagement feature comprising a rivet extending from the airbag housing configured to lock an airbag coupling ring in place with respect to an airbag housing.

FIG. 4D is a cross-sectional view depicting still another example of an engagement feature configured to lock an airbag coupling ring in place with respect to an airbag housing. More particularly, the embodiment of FIG. 4D comprises an engagement member 415D comprising a rivet extending from an airbag housing 410D that is configured to lock an airbag coupling ring 440D in place with respect to airbag housing 410D. Airbag housing 410D again comprises a lip 422D at its upper end. Rivet 415D may be configured to fit within a corresponding hole 417D or other opening formed within airbag housing 410D. Of course, in alternative embodiments, rivet 415D may be replaced by a variety of other engagement members, such as screws, bolts, pins, etc. Moreover, some embodiments need not comprise hole 417D. Instead, the engagement member 415D may be coupled directly to an exterior surface of housing 410D by, for example, welding, adhesives, and the like. Each of elements 415A/452A, 415B, 415C, and 415D are examples of means for locking an airbag coupling ring into place on an airbag housing.

Figure 5:
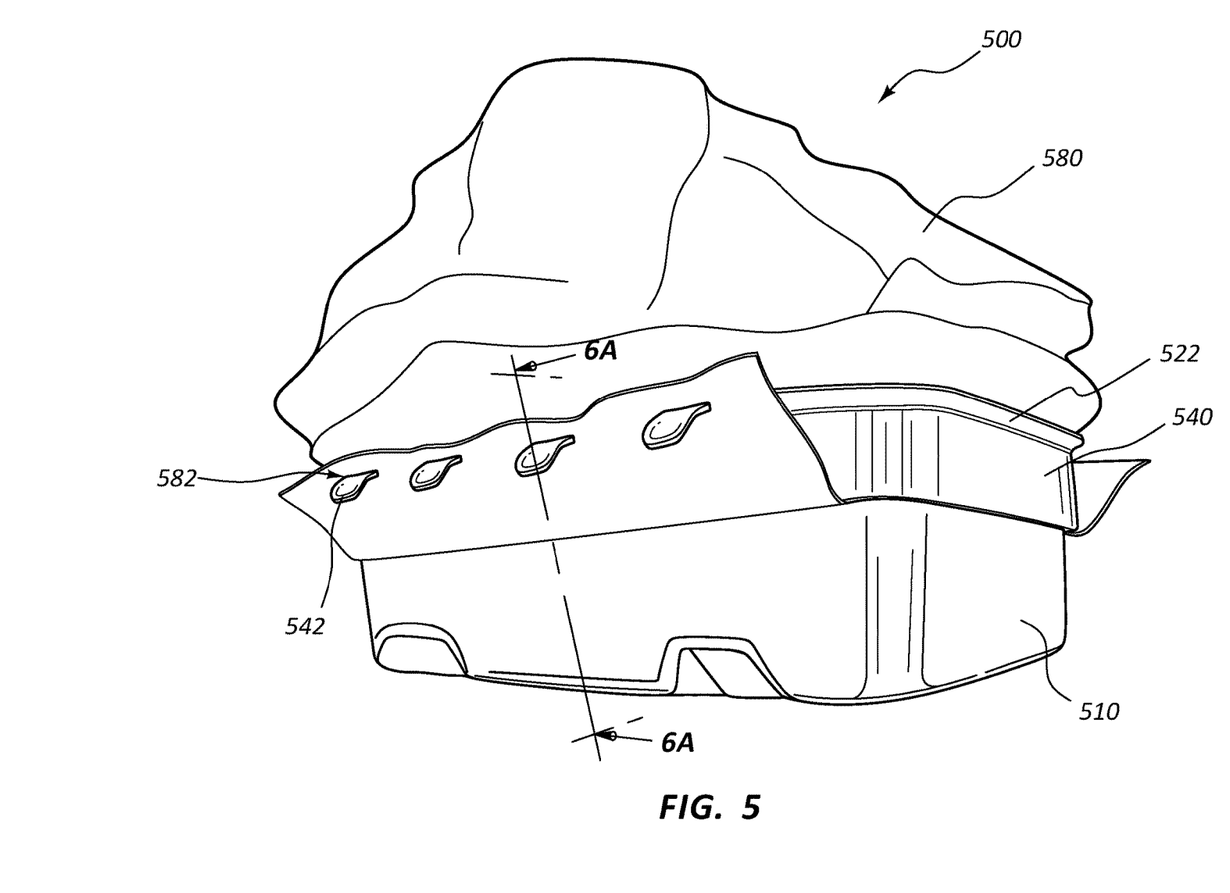
FIG. 5 is a perspective view of another embodiment of an airbag assembly in which the airbag cushion is wrapped around the coupling ring and in which engagement features on the coupling ring extend through the airbag cushion.

FIG. 5 is a perspective view of another embodiment of an airbag assembly 500 comprising an airbag housing 510 and an airbag coupling ring 540 configured to secure an airbag cushion 580 to the airbag housing 510 without coupling the cushion immediately adjacent to an inflator of the assembly 500. Airbag assembly 500 comprises an embodiment in which the airbag cushion 580 is wrapped around the airbag coupling ring 540 and in which engagement features 542 on the coupling ring 540 extend through openings 582 in the airbag cushion 580. Airbag housing 510 further comprises a lip 522. As discussed below and better illustrated in FIG. 6A, airbag coupling ring 540 is positioned adjacent to lip 522, which may prevent airbag coupling ring 540 from being pushed all of the way over airbag housing 510 and past lip 522.

In some embodiments, openings 582 may be pre-formed within airbag cushion 580 at desired locations. Alternatively, assembly 500 may be configured such that engagement features 542 may form openings 582 during assembly.

Figure 6A:
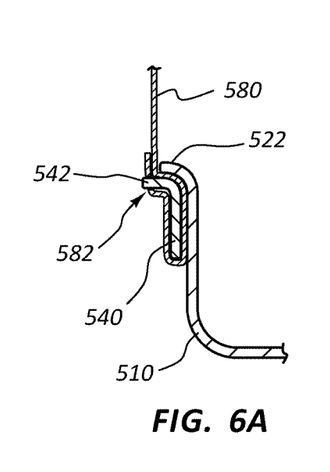
FIG. 6A is a cross-sectional view taken from line 6A-6A in FIG. 5 depicting the interface between the airbag cushion, the coupling ring, and the airbag housing.

FIG. 6A is a cross-sectional view taken from line 6A-6A in FIG. 5 and depicts the interface between airbag cushion 580, coupling ring 540, and airbag housing 510. More particularly, it can be seen that airbag cushion 580 extends adjacent to an outer peripheral surface of airbag housing 510 and an inner surface of coupling ring 540, is wrapped around a lower surface of coupling ring 540, and extends through a tab 542 of coupling ring 540. In some embodiments, tab 542 may also serve as a means for coupling the airbag assembly 500 to a vehicle. However, other embodiments are contemplated in which tabs 542 or other similar projections may be formed solely, or at least primarily, for the purpose of being extended through openings 582 on airbag cushion 580 to retain airbag cushion 580 during deployment.

Coupling ring 540 may be used to pinch the airbag cushion 580 against the outer surface of housing 510. In addition, assembly 500 may be configured such that this engagement becomes tighter as the cushion 580 is forced away from the housing 510 during deployment. This is because by wrapping cushion 580 around coupling ring 540 and/or extending one or more portions of coupling ring 540 through the cushion 580, the force generated by the deployment of cushion 580 will also force coupling ring 540 into tighter engagement with housing 510, thereby increasing the pressure or squeezing force on the cushion 580 in between coupling ring 540 and housing 510. As also illustrated in FIG. 6A, in this particular embodiment, airbag cushion 580 is coupled to housing 510 without extending any of the material making up cushion 580 inside housing 510.

Figure 6B:
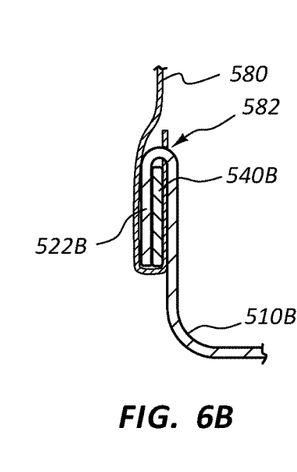
FIG. 6B is a cross-sectional view of the interface between the airbag cushion, the coupling ring, and the airbag housing of another embodiment.

FIG. 6B is a cross-sectional view of an alternative embodiment depicting the interface between airbag cushion 580, coupling ring 540B, and airbag housing 510B. In this embodiment, airbag housing 510B comprises a hook 522B that extends in a U-shape. Other shapes are, of course, possible in alternative embodiments, such as V-shapes and the like. However, it may be desirable for certain embodiments to have a hook 522B that extends towards the bottom of the airbag housing 510B so as to define a channel region within the hook 522B. In some embodiments, airbag housing 510B may comprise a plurality of spaced-hooks 522B. In other embodiments, the entire peripheral rim of airbag housing 510B may comprise the hook-shape depicted in FIG. 6B.

Slits 582 or other openings formed within airbag cushion 580 may be positioned through hook(s) 522B. Coupling ring 540B may then be slid between each hook(s) 522B and the airbag cushion 580. Airbag cushion 580 may then be wrapped around the bottom portions of coupling ring 540B and hook 522B, as depicted in FIG. 6B. Coupling ring 540B may comprise a flat, or at least relatively flat, cylindrical coupling ring. Coupling ring 540B may be locked into place on airbag housing 510B by use of an engagement member or another similar feature, such as any of the examples of means for locking an airbag coupling ring into place on an airbag housing described herein. In the embodiment of FIG. 6B, airbag cushion 580 is coupled to housing 510B without extending any of the material making up cushion 580B inside housing 510B. Although not shown in FIGS. 6A-6G, it should be understood that any of these embodiments may further comprise any of the means for locking an airbag coupling ring into place on an airbag housing described elsewhere herein.

Figure 6C:
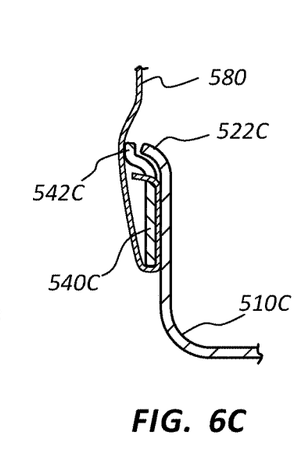
FIG. 6C is a cross-sectional view of the interface between the airbag cushion, the coupling ring, and the airbag housing of still another embodiment.

FIG. 6C is a cross-sectional view of an alternative embodiment depicting the interface between airbag cushion 580, coupling ring 540C, and airbag housing 510C. In this embodiment, the affixation path for airbag cushion 580 is reversed compared to the embodiment of FIG. 6A. More particularly, airbag cushion 580 is initially extended through coupling ring 540C near one end of airbag cushion 580, then wrapped around a lower end of coupling ring 540C. Coupling ring 540C is also depicted as having a tip 542C that extends laterally to nest with lip 522C of airbag housing 510C and then extends upward. However, alternative embodiments are contemplated in which another coupling ring, such as coupling ring 540, may be used instead.

The embodiment depicted in FIG. 6C may be particularly useful in, for example, situations/configurations in which the loading of the cushion 580 during deployment creates a tear or snag across the upper edge(s) of the housing and/or coupling ring. By providing a tip 542C that extends across the outer edge of lip 522C and/or providing a configuration wherein the cushion 580 does not directly engage lip 522C, such problems may be avoided, or at least reduced.

Figure 6D:
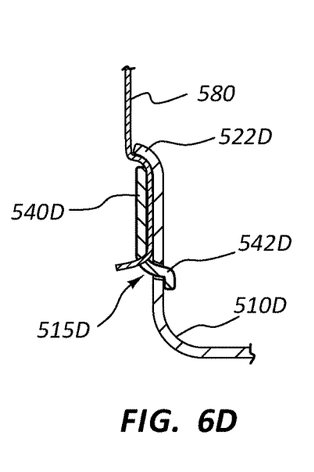
FIG. 6D is a cross-sectional view of the interface between the airbag cushion, the coupling ring, and the airbag housing of yet another embodiment.

FIG. 6D is a cross-sectional view of an alternative embodiment depicting the interface between airbag cushion 580, coupling ring 540D, and airbag housing 510D. In this embodiment, the loop around the lower portion of the coupling ring 540D has been eliminated, which may provide for easier assembly. Instead, cushion 580 extends through one or more hooks 542D on coupling ring 540D. In some embodiments, such hooks 542D may be discretely spaced around a perimeter of coupling ring 540D. Hooks 542D may also extend through openings 515D formed in a sidewall of airbag housing 510D to lock the coupling ring 540D to the housing 510D. Thus, during deployment, coupling ring 540D may pinch airbag cushion 580 against an outer wall of housing 510D, similar to other embodiments. A lip 522D may prevent the coupling ring 540D from being extended entirely over airbag housing 510D.

Figure 6E:
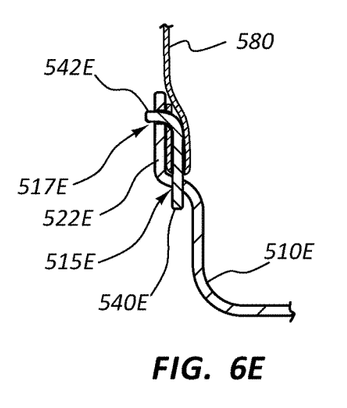
FIG. 6E is a cross-sectional view of the interface between the airbag cushion, the coupling ring, and the airbag housing according to another embodiment.

FIG. 6E is a cross-sectional view of still another alternative embodiment depicting the interface between airbag cushion 580, coupling ring 540E, and airbag housing 510E. In this embodiment, coupling ring 540E is positioned against an interior surface of airbag housing 510E. In addition, coupling ring 540E is coupled with airbag housing 510E by way of multiple slots or openings 515E/517E. A first slot or plurality of slots 515E may be configured to receive the bottom or base of coupling ring 540E, whereas a second slot or plurality of slots 517E may be configured to receive hooks 542E formed on the opposite end of coupling ring 540E. Hooks 542E may be discretely spaced around a perimeter of coupling ring 540E. During some implementations of assembly of this embodiments, the lower slot or opening 515E may be engaged first, after which the upper slot/opening 517E may be snapped into place to lock the assembly prior to installation/deployment. Coupling ring 540E may extend through airbag cushion 580 at two separate locations to secure the cushion 580 in place, as shown in the figure. In addition, in some embodiments, airbag housing 510E may comprise an internal ledge within which one or more slots/openings 515E may be formed to receive a lower end of airbag housing 510E.

The embodiment depicted in FIG. 6E may be particularly useful as a countermeasure to a loss of pinch/compression on the airbag cushion 580. This is because the internal cushion pressure during deployment may help keep the pinched portion of the cushion in compression between coupling ring 540E and airbag housing 510E.

Figure 6F:
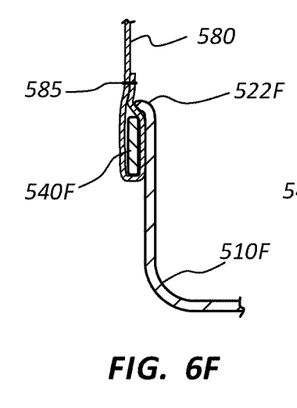
FIG. 6F is a cross-sectional view of the interface between the airbag cushion, the coupling ring, and the airbag housing according to still another embodiment.

FIG. 6F is a cross-sectional view of yet another alternative embodiment depicting the interface between airbag cushion 580, coupling ring 540F, and airbag housing 510F. In this embodiment, a stitch 585 or another means for forming a loop in an airbag, such as an adhesive, staple, tack, or the like, may be used to secure a loop of fabric that extends around coupling ring 540F adjacent to an exterior surface of airbag housing 510F and a lip 522F of airbag housing 510F. Although this is accomplished without the use of hooks on coupling ring 540F, other embodiments may include such hooks, or any of the other similar engagement features and/or means for coupling an airbag assembly to a vehicle. During assembly, in some implementations, coupling ring 540F may be positioned and secured within the loop of cushion 580 material and sewn closed prior to installation on the airbag housing 510F. As previously mentioned, in preferred embodiments, various features or means for locking an airbag coupling ring into place on an airbag housing, as described elsewhere herein (such as projection 515G discussed below), may be provided to secure coupling ring 540F on housing 510F. Such features/means may be provided on any of the embodiments disclosed herein.

Figure 6G:
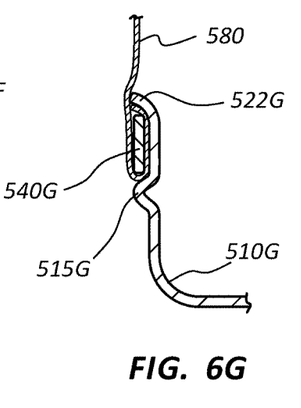
FIG. 6G is a cross-sectional view of the interface between the airbag cushion, the coupling ring, and the airbag housing according to yet another embodiment.

FIG. 6G is a cross-sectional view of another embodiment depicting the interface between airbag cushion 580, coupling ring 540G, and airbag housing 510G. In this embodiment, a loop of cushion 580 material is wrapped around coupling ring 540G, and coupling ring 540G is wedged between lip 522G and projection 515G to secure the assembly in place. Projection 515G may comprise, for example, a buckled or bent portion of airbag housing 510G. Alternatively, projection 515G may comprise a spring finger, such as spring finger 415C, an engagement member, such as rivet 415D, or any of the other means for locking an airbag coupling ring into place on an airbag housing disclosed herein. In addition, although the embodiment depicted in FIG. 6G does not comprise a stitch or other coupling means, such as stitch 585, such a stitch or other coupling means may be provided in alternative embodiments.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An airbag assembly, comprising:
   an airbag housing comprising an outer surface and configured to receive an airbag cushion therein;
   an airbag coupling ring configured to fit over the outer surface of the airbag housing; and
   an airbag cushion positioned in between the airbag housing and the airbag coupling ring such that the airbag cushion is directly pinched between the airbag coupling ring and the outer surface of the airbag housing so as to retain the airbag cushion to the airbag housing during deployment of the airbag cushion.

2. The airbag assembly of claim 1, wherein the airbag coupling ring comprises a B-ring.

3. The airbag assembly of claim 1, wherein the airbag coupling ring further comprises means for coupling the airbag assembly to a vehicle.

4. The airbag assembly of claim 3, wherein the means for coupling the airbag assembly to a vehicle comprises means for coupling the airbag assembly to an instrument panel of a vehicle.

5. The airbag assembly of claim 3, wherein the means for coupling the airbag assembly to a vehicle comprises a plurality of hooks extending about an exterior surface of the airbag coupling ring.

6. The airbag assembly of claim 1, wherein the airbag housing comprises a bottom wall and an open end opposite from the bottom wall, the open end defined by a peripheral edge of the airbag housing.

7. The airbag assembly of claim 6, wherein the bottom wall defines an opening, and wherein the opening is configured to receive an inflator.

8. The airbag assembly of claim 1, wherein the airbag housing comprises an engagement feature configured to lock the airbag coupling ring in place with respect to the airbag housing.

9. An airbag assembly, comprising:
   an airbag housing comprising an inner peripheral surface and an outer peripheral surface;
   an airbag coupling ring configured to be slidably positioned adjacent to at least one of the inner peripheral surface and the outer peripheral surface of the airbag housing; and
   an airbag cushion contained within the airbag housing, wherein the airbag cushion is positioned in between at least one of the inner peripheral surface and the outer peripheral surface of the airbag housing and the airbag coupling ring such that the airbag cushion is directly pinched between the airbag coupling ring and the airbag housing so as to retain the airbag cushion to the airbag housing during deployment of the airbag cushion.

10. The airbag assembly of claim 9, wherein the airbag coupling ring is positioned adjacent to the outer peripheral surface of the airbag housing.

11. The airbag assembly of claim 9, wherein the airbag housing comprises an engagement feature configured to lock the airbag coupling ring in place with respect to the airbag housing.

12. The airbag assembly of claim 11, wherein the airbag coupling ring comprises an engagement feature configured to engage with the engagement feature of the airbag housing to lock the airbag coupling ring in place with respect to the airbag housing.

13. The airbag assembly of claim 12, wherein the engagement feature of the airbag housing comprises an opening in the airbag housing, and wherein the engagement feature of the airbag coupling ring comprises a projection configured to fit within the opening in the airbag housing to lock the airbag coupling ring in place with respect to the airbag housing.

14. The airbag assembly of claim 11, wherein the engagement feature comprises at least one of a projection formed on the airbag housing, a spring finger extending from the airbag housing, and an opening formed within the housing.

15. The airbag assembly of claim 9, wherein the airbag cushion is wrapped around an edge of the airbag coupling ring, and wherein at least a portion of the airbag coupling ring extends through the airbag cushion.

16. A method for assembly of an airbag assembly, the method comprising the steps of:
 obtaining an airbag housing comprising a bottom wall, the bottom wall defining an opening for receipt of an inflator;
 obtaining an airbag coupling ring;
 obtaining an airbag cushion comprising a throat and a closed end opposite from the throat;
 positioning a first end of the airbag housing into the throat of the airbag cushion;
 sliding the airbag coupling ring over the airbag cushion and the airbag housing such that a periphery of the airbag cushion is positioned between the airbag coupling ring and the airbag housing; and
 locking the airbag coupling ring to the airbag housing to secure the coupling ring to the airbag housing and retain the airbag cushion to the airbag housing during deployment of the airbag cushion.

17. The method of claim 16, wherein the step of locking the airbag coupling ring to the airbag housing comprises extending the airbag coupling ring either up to or past an engagement feature to lock the airbag coupling ring in place with respect to the airbag housing.

18. The method of claim 16, wherein the step of locking the airbag coupling ring to the airbag housing comprises extending a plurality of projections extending from the airbag coupling ring through a plurality of openings in the airbag cushion.

19. The method of claim 18, wherein the plurality of projections are configured to allow for coupling the airbag assembly to a vehicle.

20. The method of claim 16, further comprising positioning the inflator into the opening and coupling the inflator with the airbag housing.

21. The method of claim 16, wherein the step of sliding the airbag coupling ring over the airbag cushion and the airbag housing such that a periphery of the airbag cushion is positioned between the airbag coupling ring and the airbag housing comprises sliding the airbag coupling ring over the airbag cushion and the airbag housing such that a portion of the airbag cushion is directly pinched between the airbag coupling ring and the airbag housing.

* * * * *